(12) United States Patent
An (10) Patent No.: US 6,192,438 B1
(45) Date of Patent: Feb. 20, 2001

(54) U-INTERFACE MATCHING CIRCUIT AND METHOD

(75) Inventor: Ki Hyuk An, Kunpo (KR)

(73) Assignee: LG Information & Communications, Ltd., Seoul (KR)

( * ) Notice: Under 35 U.S.C. 154(b), the term of this patent shall be extended for 0 days.

(21) Appl. No.: 09/223,749

(22) Filed: Dec. 31, 1998

(30) Foreign Application Priority Data

Sep. 18, 1998 (KR) .................................................. 98-38778

(51) Int. Cl.[7] .................................................. G06F 13/00
(52) U.S. Cl. .................................................. 710/129
(58) Field of Search .................................. 710/1, 20, 21, 710/62, 63, 72, 129, 131; 709/238

(56) References Cited

U.S. PATENT DOCUMENTS

| | | | |
|---|---|---|---|
| 4,700,020 | * 10/1987 | Michels-Krohn et al. | 178/2 R |
| 4,763,294 | * 8/1988 | Fong | 708/510 |
| 4,766,596 | * 8/1988 | Michels-Krohn et al. | 714/815 |
| 5,133,001 | * 7/1992 | Bohm | 455/464 |
| 5,396,552 | * 3/1995 | Jahn et al. | 379/396 |
| 5,630,163 | * 5/1997 | Fung et al. | 710/127 |
| 5,729,683 | * 3/1998 | Le et al. | 709/237 |

* cited by examiner

Primary Examiner—Xuan M. Thai
(74) Attorney, Agent, or Firm—Fleshner & Kim, LLP

(57) ABSTRACT

A U-interface matching circuit and matching method is disclosed. The circuit includes a plurality of BRI (Basic Rate Interface) boards implementing a digital subscriber's matching, a control board controlling operating modes of the plurality of BRI boards and an SA (Serial Access)-bus providing an independent data transmission path with regard to the plurality of BRI boards. The method includes a first step identifying mounting locations of a plurality of BRI boards, a second step reading an RX flag area of a first BRI board for data transmission and identifying whether the read RX flag is a flag representing the access complete of the first BRI board, a third step setting the first BRI mode as a write mode and transmitting the data length value and transmission data when the RX flag is a flag representing an access complete of the first BRI board, and a fourth step receiving transmission data of the first BRI board. The method further includes a first step setting a read mode by a control board, a second step reading a TX flag area and identifying whether the read TX flag represents an access complete of the control board, a third step transmitting a data length value and transmission data to the control board when the TX flag is a flag representing an access complete of the control board, and a fourth step receiving the data from the control board.

20 Claims, 7 Drawing Sheets

| SLOT | 24 | 25 | 26 | 27 | 28 | 29 | 30 | 31 |
|---|---|---|---|---|---|---|---|---|
| ID | 0x18 | 0x19 | 0x1a | 0x1b | 0x1c | 0x1d | 0x1e | 0x1f |
| SLOT | 16 | 17 | 18 | 19 | 20 | 21 | 22 | 23 |
| ID | 0x10 | 0x11 | 0x12 | 0x13 | 0x14 | 0x15 | 0x16 | 0x17 |
| SLOT | 8 | 9 | 10 | 11 | 12 | 13 | 14 | 15 |
| ID | 0x08 | 0x09 | 0x0a | 0x0b | 0x0c | 0x0d | 0x0e | 0x0f |
| SLOT | 0 | 1 | 2 | 3 | 4 | 5 | 6 | 7 |
| ID | 0x00 | 0x01 | 0x02 | 0x03 | 0x04 | 0x05 | 0x06 | 0x07 |

U-INTERFACE MATCHING CIRCUIT AND METHOD

BACKGROUND OF THE INVENTION

1. Field of the Invention

The present invention relates to an exchanging system, and more particularly, to an improved U-interface matching circuit and matching method capable of performing a matching function between an exchanging system and a subscriber's terminal.

2. Description of the Background Art

The conventional exchanging system employs an SCC (Serial Communication Controller) of an IMP (Integrated Multiprotocol Processor) for a U-interface matching of BRI (Basic Rate Interface) and implements a control board and hierochical three communications at the rate of 256 kbps through a SC-bus (Serial Communication-bus). Also, The exchanging system implements PCM data communication at 4.906 Mbps via an additional PCM sub-highway for the PCM matching.

Figure 1:
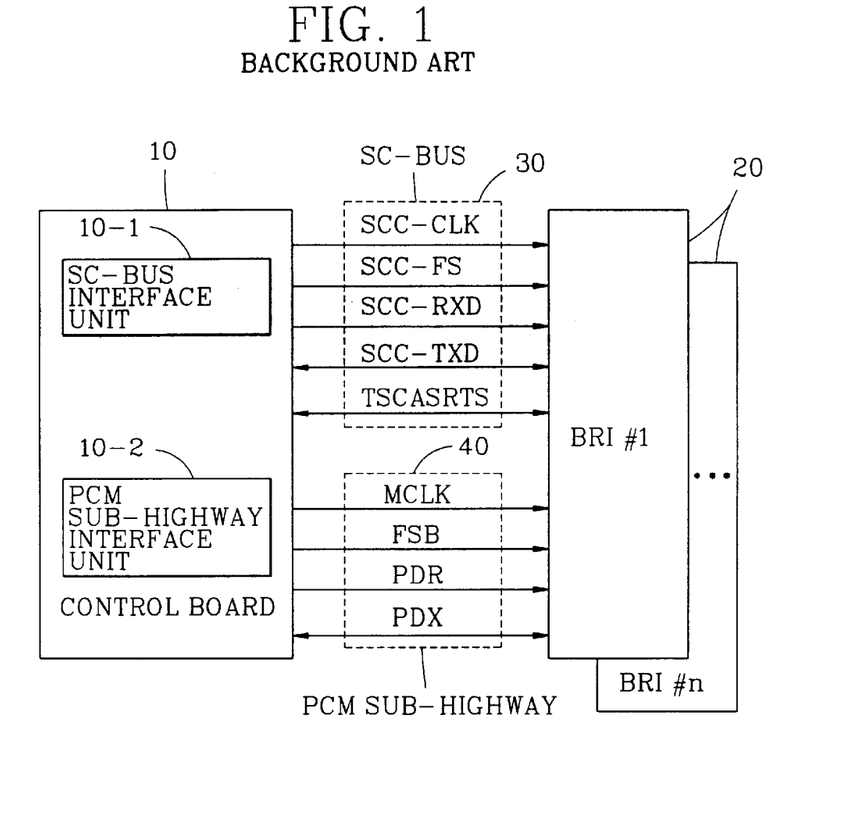
FIG. 1 is a view illustrating a U-interface matching circuit in a conventional exchanging system.

As shown in FIG. 1, the conventional U-interface matching circuit includes a control board 10 having an SC-bus interface unit 10-1 and a PCM sub-highway interface unit 10-2, a BRI board 20 having a plurality of BRI#1–BRI#n, and a DC-bus 30 and a PCM sub-highway 40 performing a U-interface matching of BRI and an additional PCM matching. The BRI boards BRI#1–BRI#n 20 are connected in common to the SC-bus 30 on a back plane, and a 16-channel BRI board is mounted on the back plane.

Figure 2:
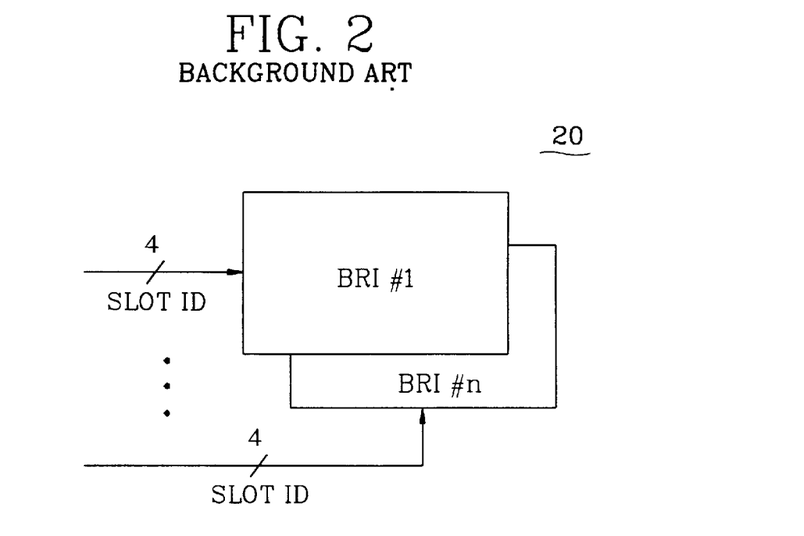
FIG. 2 is a view illustrating 4 real lines implemented in hardware for identifying a mounting location of a BRI board on a back plane in FIG. 1.

As further shown in FIG. 2, the BRI boards BRI#1–BRI#n 20 are connected in common to 4 real lines implemented in hardware, and respective slot ID numbers are represented in 4 bits (i.e. "0011"). As a result, using the slot ID numbers from the control board 10, the location of the BRI boards 20 mounted/demounted on/from the back plane.

The SC-bus 30 is connected to the SC-bus interface 10-1 of the control board 10 and at the same time to the BRI boards BRI#1–BRI#n, thereby being employed for signal processing and signaling so as to implement communication with the control board 10. The SC-bus 30 includes a transmission line of 256 Kbps clock signal SCC-CLK, another transmission line of 1 ms frame synchronous signal SCC-FS, a data bus SCC-RXD for writing data on the control board 10, and the transmission lines of data bus SCC-TXD and SC-bus seizing signal TSCASRTB.

The PCM sub-highway 40 includes a transmission line of 4.096 Mbps PCM data clock signal MCLK, an 8 KHz frame synchronous signal FSB, PCM data bus PDR for writing on the control board and PCM data bus PDX for writing on the BRI board 20. Also, the PCM sub-highway 40 is connected to the PCM sub-highway interface unit 10-2 of the control board 10 and at the same time to the plurality of BRI boards BRI#1–BRI#n so as to employ the same for PCM data transmission/reception.

The operation of the thusly constituted conventional U-interface matching circuit will now be described with reference to the accompanying drawings.

The SC-bus 30 is connected in common to all the BRI boards 20 in the back planes. Therefore, in order to implement data transmission, the control board 10 or the respective RI boards 20 identifies the state of the SC-bus seizing signal TSCASRTB which is shared by the both thereof so as to attempt the seizing of the SC-bus 30.

Figure 3:
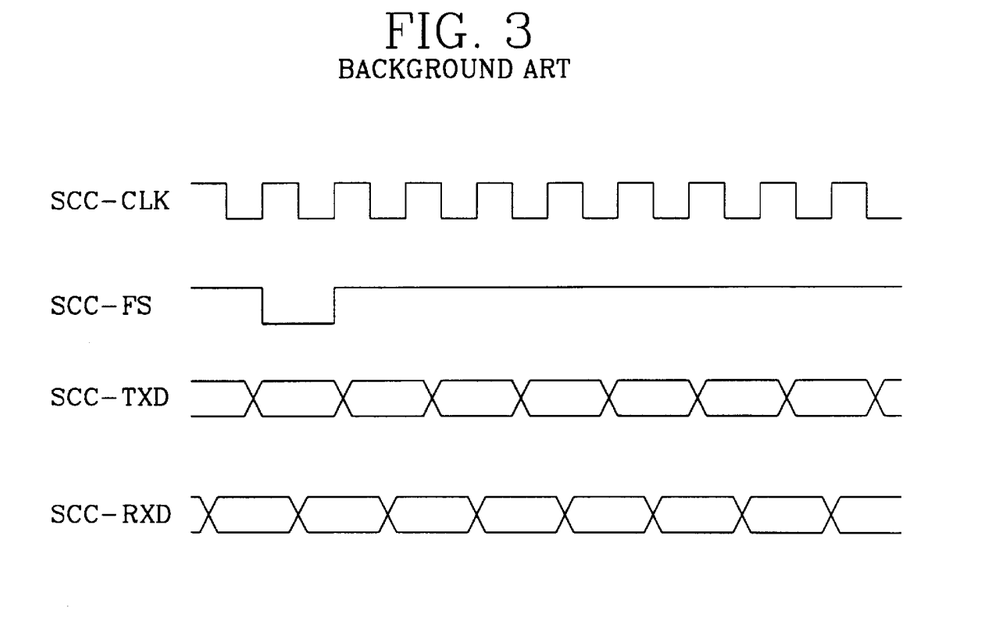
FIG. 3 is a view illustrating timing waveforms of data reception/transmission implemented through an SC-bus in FIG. 1.

For example, in a state in which the control board 10 seizes the SC-bus 30 and transmits packet data to a third BRI board BRI#3. Initially, the control board 10 identifies the level of the SC-bus seizing signal TSCASRTB and checks whether the SC-bus 30 is presently employed. At this time, the SC-bus 30 is seized by the present first BRI board BRI#1 so that the SC-bus seizing signal TSCASRTB becomes a low level. Accordingly, the control board 10 sustains the seizure of the SC-bus 30 until the SC-bus seizing signal TSCASRTB transits to a high level and waits.

When the first BRI board BRI#1 discharges the seizure of the SC-bus 30 and the SC-bus seizing signal TSCASRTB becomes a high level, the control board 10 seizes the SC-bus 30, and while the frame synchronous signal SCC-FS maintains a high level the slot ID numbers and the packet data are transmitted to the third BRI board BRI#3 through the data bus SCC-RXD. In FIG. 2, there are provided 4 real lines implemented in hardware to provide the slot ID numbers of the respective BRI boards 20, and the respective slot ID numbers are represented in 4 bits (i.e. "0011").

When the control board 10 discharges the seizure of the SC-bus 30, the BRI boards 20 seizes the SC-bus so that the packet data is transmitted to the control board 10 through the data bus SCC-TXD during a high level interval of the frame synchronous signal SCC-FS outputted from the control board 10.

Figure 4:
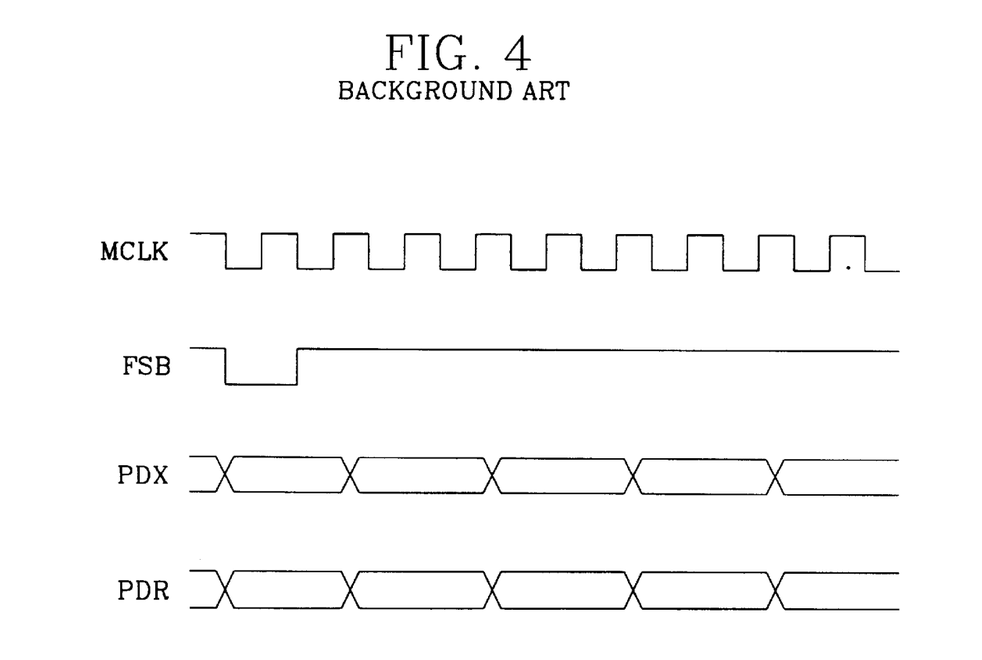
FIG. 4 is a view illustrating timing waveforms of PCM data reception/transmission implemented through a PCM sub-highway in FIG. 1.

Meanwhile, in order to implement PCM matching, the conventional BRI U-interface matching circuit performs PCM data communication at 4.906 Mbps through the additional PCM sub-highway 40. That is, the control board 10 receives/transmits PCM data DR, DX through PCM data buses PDR, PDX while the frame synchronous signal FSB at 8 KHz maintains a high level.

As discussed above, the conventional U-interface matching circuit allows the control board 10 and the respective boards 20 to seize the SC-bus 30, receive/transmit the packet data at 256 Kbps and perform the PCM data communication at 4.906 Mbps through the additionally provided PCM sub-highway 40.

However, the conventional U-interface matching circuit additionally requires real lines implemented in hardware to provide the slot ID numbers, as well as the SC-bus and the PCM sub-highway, thereby disadvantageously complicating the composition of the circuit in back plane design.

Further, a plurality of BRI boards in the conventional U-interface matching circuit employ the SC-bus in common, thereby increasing the possibility of data contention during the data communication.

Still further, in the conventional U-interface matching circuit, it is difficult to implement a high speed data transmission due to a low transmission speed (256 Kbps0 of the SC-bus.

SUMMARY OF THE INVENTION

The present invention is directed to overcoming the conventional disadvantages.

Accordingly, it is an object of the present invention to provide a U-interface matching circuit capable of stably implementing the U-interface matching and PCM matching at high speed.

It is another object of the present invention to provide a U-interface matching circuit providing an SA-bus which enables a high speed data reception/transmission.

It is still another object of the present invention to provide a U-interface matching circuit and method capable f preventing a data contention by providing an independent data transmission path with regard to a plurality of BRI boards.

It is still another object of the present invention to provide a U-interface matching circuit and method capable of simplifying the circuit composition during a back plane design by integrating hardware structures for the conventional SC-bus, PCM sub-highway and slot ID numbers into one.

To achieve the above-described objects, there is provided a U-interface matching circuit according to the present invention which includes a plurality of BRI (Basic Rate Interface) boards implementing a digital subscriber's matching, a control board controlling operating modes of the plurality of BRI boards using time-divided control data, and an SA (Serial Access)-bus connected between the control board and the BRI boards and providing an independent data transmission path with regard to the plurality of BRI boards.

Further, to achieve the above-described objects, there is provided a U-interface matching method according to the present invention which includes a first step identifying mounting locations of a plurality of BRI boards, a second step reading an RX flag area of a first BRI board for data transmission and identifying whether the read RX flag is a flag representing the access complete of the first BRI board, a third step setting the first BRI mode as a write mode and transmitting the data length value and transmission data when the RX flag is a flag representing an access complete of the first BRI board, and a fourth step receiving transmission data of the first BRI board.

Still further, to achieve the above-described objects, there is provided a U-interface matching method according to the present invention which includes a first step setting a read mode by a control board, a second step reading a TX flag area and identifying whether the read TX flag represents an access complete of the control board, a third step transmitting a data length value and transmission data to the control board when the TX flag is a flag representing an access complete of the control board, and a fourth step receiving the data from the control board.

The features and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 5:
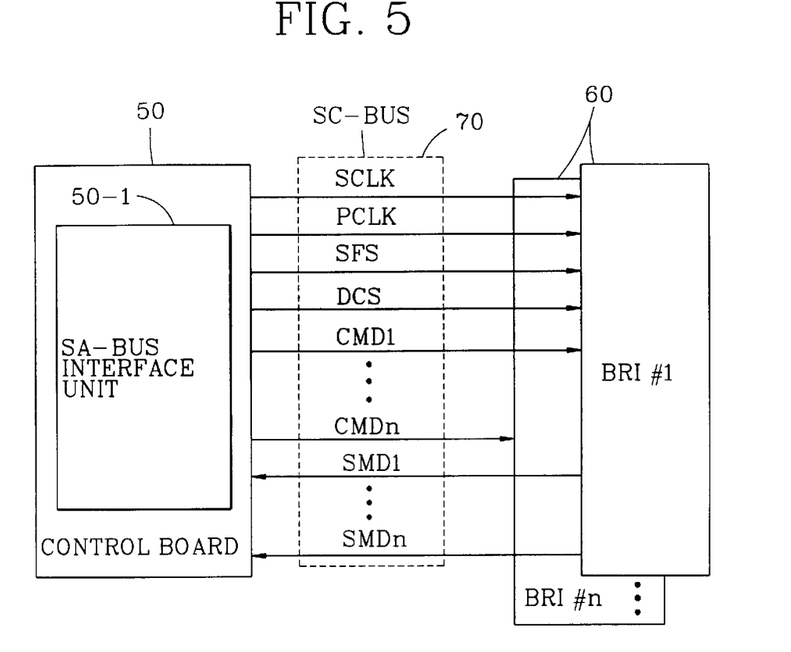
FIG. 5 is a view illustrating a U-interface matching circuit according to the present invention.

As shown in FIG. 5, the U-interface matching circuit according to the present invention includes a control board 50 having an SA(Serial Access)-bus interface unit 50-1, a BRI board unit 60 having a plurality of BRI boards BRI#1–BRI#n, and a SA-bus 37 providing a data transmission path between the control board 50 and the BRI board 60.

The BRI board 60 is connected to the control board 50 via the SA-bus 70 so as to implement a BRI digital subscriber's matching and employed as a control data between a PP (Peripheral Processor) and a subscriber's board, and a communication path such as D-channel packet and signaling data. Accordingly, 32 BRI boards BRI#1–BRI#32 having 16 channels are mounted on a back plane, thereby enabling the reception of 512 (16 channels×32) ISDN subscribers and 1024 (32 channels×32) telephone subscribers.

The SA-bus 70 is employed to receive/transmit control data, D-channel information and D-channel packet data, PCM data so as to implement communication with the control board 50. The SA-bus 70 connected to the SA-bus interface unit 50-1 in the control board 50 provides independent data transmission path with regard to the plurality of BRI boards BRI#1–BRI#n.

The SA-bus 70 includes transmission lines of a clock signal SCLK at 2.048 MHz, a PCM interface clock signal PCLK at 4.096 MHz, a PCM frame synchronous signal SFS at 8 KHz, a control data synchronous signal DCS for synchronizing the control data, transmission data bus CMD1–CMDn of the control board 50 and the transmission data bus SMD1–SMDn of the BRI board 60. Here, the two transmission data buses (CMD1–CMDn), (SMD1–SMDn) are respectively connected in common to the plurality of BRI boards BRI#1–BRI#n.

Figure 6:
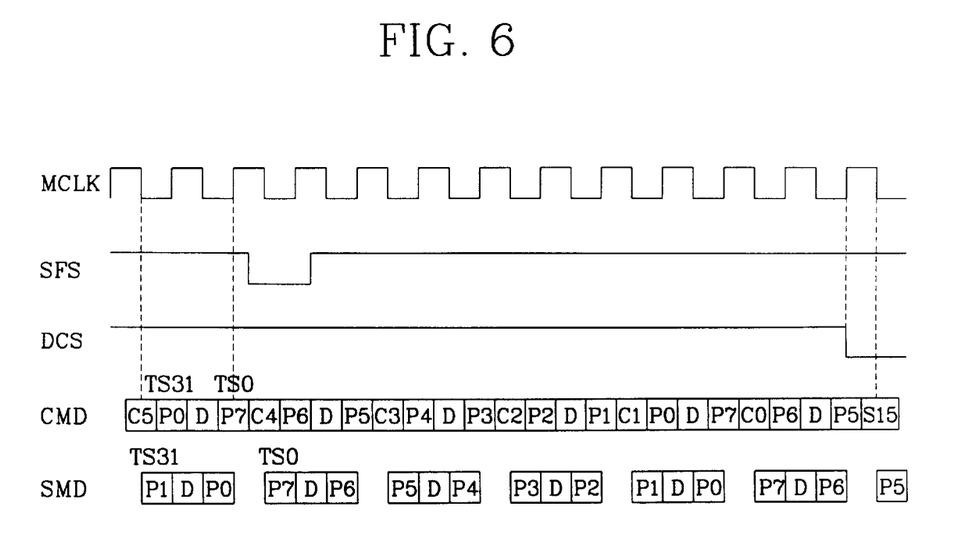
FIG. 6 is a view illustrating timing waveforms of SA-bus between a control board and BRI boards in FIG. 5.
Figure 7:
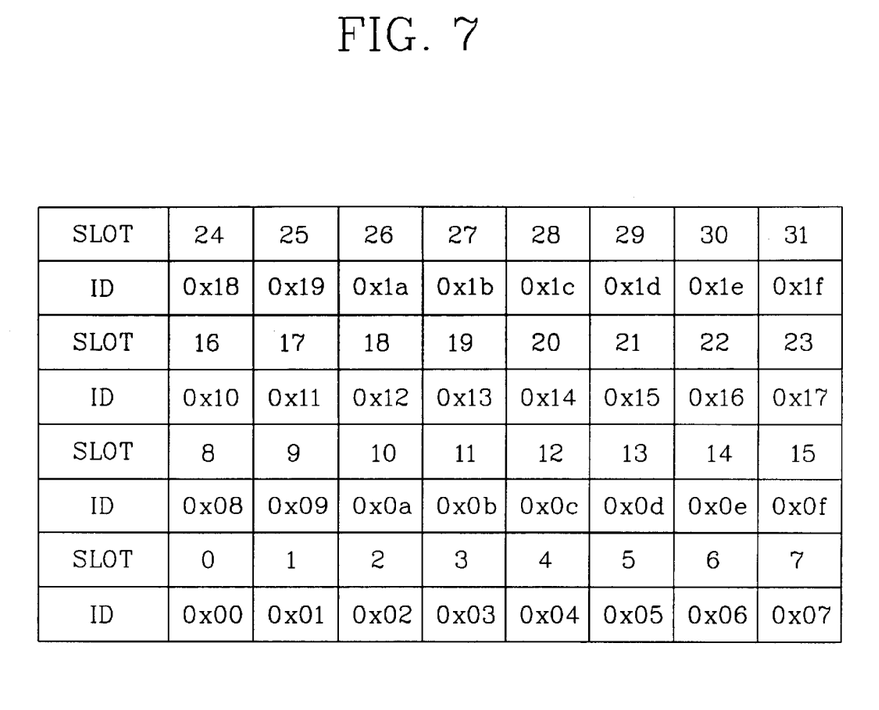
FIG. 7 is a view illustrating slot ID numbers in a BRI block in FIG. 5.

FIG. 6 shows SA-bus timing waveforms between the control board 50 and the BRI board 60. Here, C5–C0 represent control data, P7–P0 represent PCM interface data, D represents D-channel packet interface data, and S15–S0 respectively represent signaling data.

The operation of the thusly constituted U-interface matching circuit according to the present invention will now be described with reference to the accompanying drawings.

The control board 50 periodically transmits control data through the data bus CMD1–CMDn to the BRI board unit 60 having a plurality of BRI boards and identifies the locations of the plurality of BRI boards BRI#1–BRI#n mounted on the back plane.

A control data format of the BRI boards are represented in Table 1.

TABLE 1

| C5  | C4  | C3  | C2  | C1  | C0  |
|-----|-----|-----|-----|-----|-----|
| VAL | DS4 | DS3 | DS2 | DS1 | DS0 |

Here, C5 denotes a valid bit representing activation of the BRI board unit 60, and C4–C0 are mode select bits of the BRI board unit 60.

The BRI board unit 60 identifies the valid bit C5 of the control data from the control board 50. When the BRI board select board VAL of the valid bit C5 is "0", the BRI board unit 60 is operated at the control mode set by the mode select signal DS4–DS0.

In Table 2, respective operation modes of the BRI boards determined according to the control data from the control board 50.

TABLE 2

| VAL | DS4 | DS3 | DS2 | DS1 | DS0 | Modes  | Contents         |
|-----|-----|-----|-----|-----|-----|--------|------------------|
| 0   | 0   | 0   | 1   | 0   | 0   | TXFWM  | TX flag write    |
| 0   | 0   | 0   | 1   | 0   | 1   | TXFRM  | TX flag read     |
| 0   | 0   | 0   | 1   | 1   | 0   | RXFWM  | RX flag write    |
| 0   | 0   | 0   | 1   | 1   | 1   | RXFRM  | RX flag read     |
| 0   | 0   | 1   | 1   | 0   | 0   | LDWM   | length/data write|
| 0   | 0   | 1   | 1   | 0   | 1   | LDRM   | length/data read |
| 0   | 1   | 0   | 1   | 1   | 0   | SIDWRM | slot ID write    |
| 0   | 1   | 0   | 1   | 1   | 1   | SIDRDM | slot ID read     |

That is, the control board 50 periodically outputs the control data (010111) through the data bus CMD1–CMDn to the BRI board unit 60 so as to determine BRI board unit 60 as the slot ID read mode (SIDRDM). The plurality of BRI boards determined as the slot ID read mode (SIDRDM) identifies the valid bit C5 of the control data (010111) and determined whether the BRI board select signal is "0".

Figure 8:
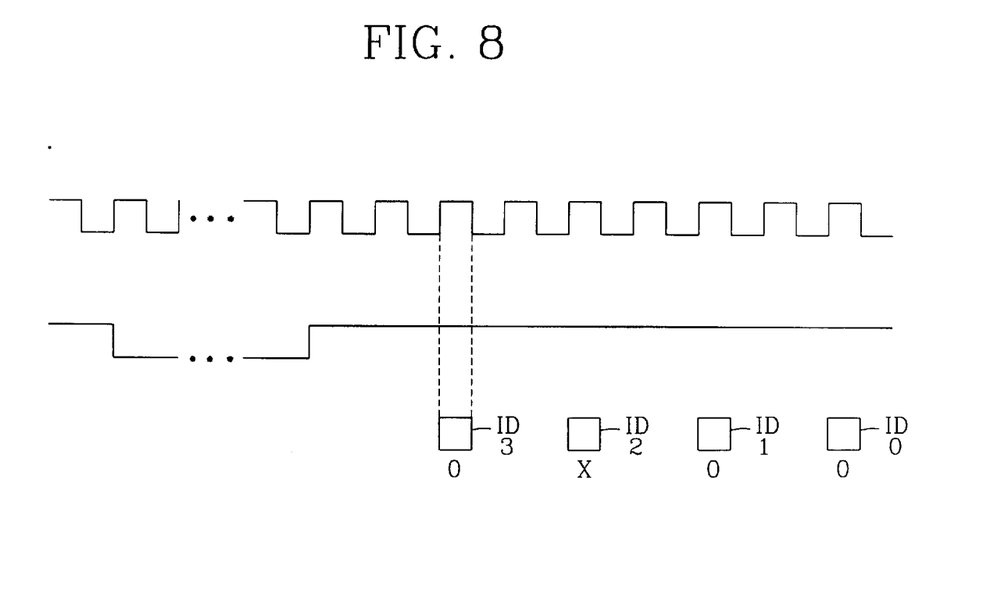
FIG. 8 is a view illustrating timing waveforms for reading all the slot ID numbers stored in FPGA (Field Programmable Array) in the respective blocks.

If the BRI board select signal VAL is determined as "0", the plurality of BRI boards in the BRI board unit 60 read the slot ID stored in a FPGA (Field programmable Array)(not shown). Then, as shown in FIG. 8, the 4-bit BRI ID (0x04) is transmitted to the control data at an interval in which the control data synchronous signal DCS is at a high level. At this time, the slot ID which is periodically written by the control board 50 is stored on the FPGA.

Therefore, the control board 50 identifies the input slot ID and recognizes 4-bit board ID, thereby confirming the mounting locations of the plurality of BRI boards in the BRI board unit 60.

On an SRAM (not shown) of the BRI board unit 60 there are provided a TX flag area and an RX flag area. The TX flag area is an area to transmit the data to the control board 50 and the RX flag area is an area to transmit the data to the BRI board unit 60. The TX/RX area is provided such that it can be readable/writable at both directions toward the control board 50 and the BRI board unit 60.

In Table 3, a data interface flag of the BRI board unit 60 is represented.

TABLE 3

| Flags | States                       |
|-------|------------------------------|
| 0x00  | initialized                  |
| 0x01  | control board access started |

TABLE 3-continued

| Flags | States                       |
|-------|------------------------------|
| 0x02  | control board access completed |
| 0x03  | BRI board access started     |
| 0x04  | BRI board access completed   |

Here, 0x01, 0x02 represent flags denoting that the control board 50 is being accessed, and 0x03 represents a flag denoting that the plurality of BRI boards in the board unit 60 are being accessed.

Accordingly, the control board 50 sequentially writes the flags 0x01, 0x02 denoting the access start and complete on the TX flag areas of the BRI boards BRI#1–BRI#n in order to set the BRI board unit 60 as a read mode, and the control board 50 sequentially writes the flags 0x03, 0x04 denoting the access start and complete on the TX flag areas of the BRI boards BRI#1–BRI#n in order to set the BRI board unit 60 as a write mode.

When the BRI board unit 60 is set at a read mode by the control board 50, the BRI board unit 60 sequentially writes flag 0x03, and flag 0x04 representing their own access start and complete on the TX flag area of its own. When the BRI board unit 60 is set at a write mode, the flag 0x01 and flag 0x02 are sequentially written representing their own access start and complete on the RX flag area of its own.

Accordingly, when the mounting location of the respective BRI board unit 60 is identified in accordance with the slot ID, the control board 50 reads the RX flag from the RX flag area of the BRI board for data transmission and transmits the data only when the Rx flag is 0x04. Also, the BRI board unit 60 reads the TX flag from the TX flag area of its own only when the BRI board select signal VAL from the control board 50 is "0" and transmits the data only when the TX flag is 0x02.

The operation of the data transmission/reception of the BRI boards and the control board will now be explained with reference to the flow charts in FIGS. 11 and 12.

Figure 11:
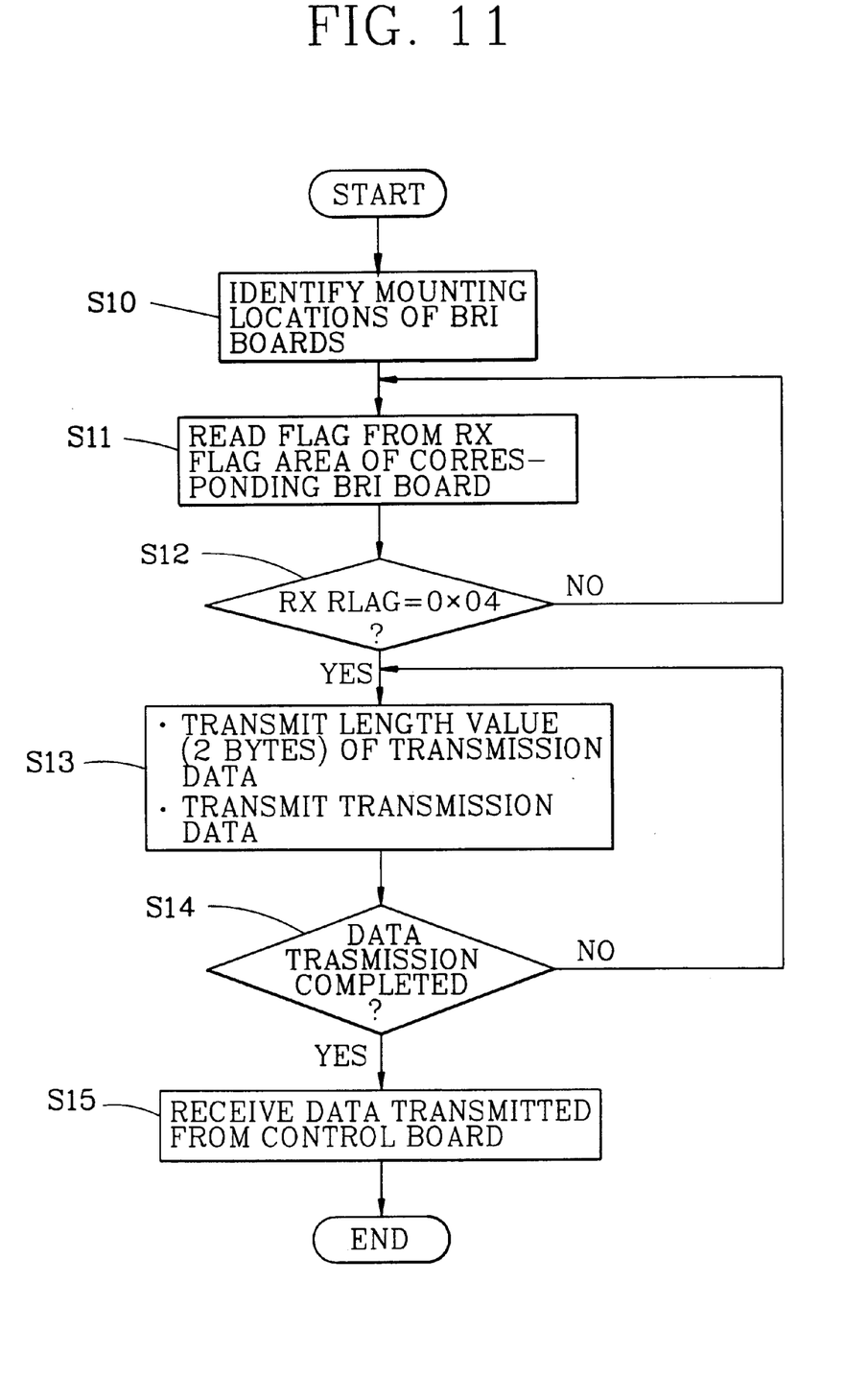
FIG. 11 is a flow chart illustrating transmission of data from the control board to the BRI blocks in FIG. 9.

(1) Data Transmission from the Control Board to the BRI Boards As shown in FIG. 11, the control board 50 initially identifies the mounting location of the plurality of BRI boards of the BRI board unit 60 in step S10.

Since the slot ID periodically written by the control board 50 is stored on the FPGA of the BRI board unit 60, the control board 50 determines the BRI boards of the unit 60 as the slot ID read mode (SIDRDM), recognizes the slot ID and a 4-bit board ID from the BRI board unit 60 and identifies the mounting locations of the plurality of BRI boards BRI#1–BRI#n.

When the respective BRI boards BRI#1–BRI#n are identified, the control board 50 reads the RX flag from the RX flag area of the corresponding BRI board for the data transmission in step S11.

Figure 9:
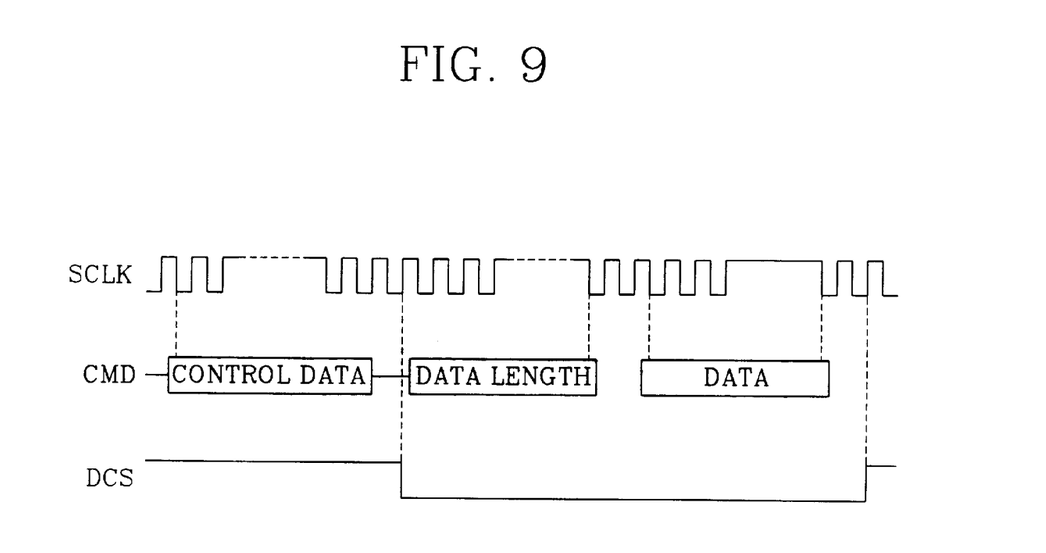
FIG. 9 is a view illustrating timing waveforms for transmitting data from the control board to the BRI blocks in FIG. 5.

That is, as shown in FIG. 9, the control board 50 outputs the control data 000111 to a selected BRI block BRI#1, determines the BRI#1 as the RX flag read mode RXFRM and receives from the BRI#1 the RX flag read from the RX flag area.

When the RX flag reception is completed, the control board 50 determines whether the access of the RX flag to the BRI#1 is completed in step S12. Here, if the RX flag is not 0x04 the step 511 is performed again and if the RX flag is 0x04 the control board 50 writes its own access start on the RX flag areas of all the BRI boards of the board unit 60 and transmits the transmission data together with a 2-byte data length value of the transmission data through the data bus CMD1 to the BRI#1 in step S13. The control board 50 maintains the control data synchronous signal DCS at a low level as much as the transmission data length. When the data transmission is completed, the control board 50 writes the flag 0x02 representing the access complete on the RX flag area of all the BRI boards of the board unit 60 in step S14.

Therefore, BRI#1 writes the flag 0x03 representing the access start on the RX flag area of its own, receives the transmission data, and writes the flag 0x04 representing the access complete on the RX flag area when the transmission data read is completed in step S15.

Likewise, the control board 50 transmits the data to the plurality of the BRI boards of the board unit 60.

Figure 10:
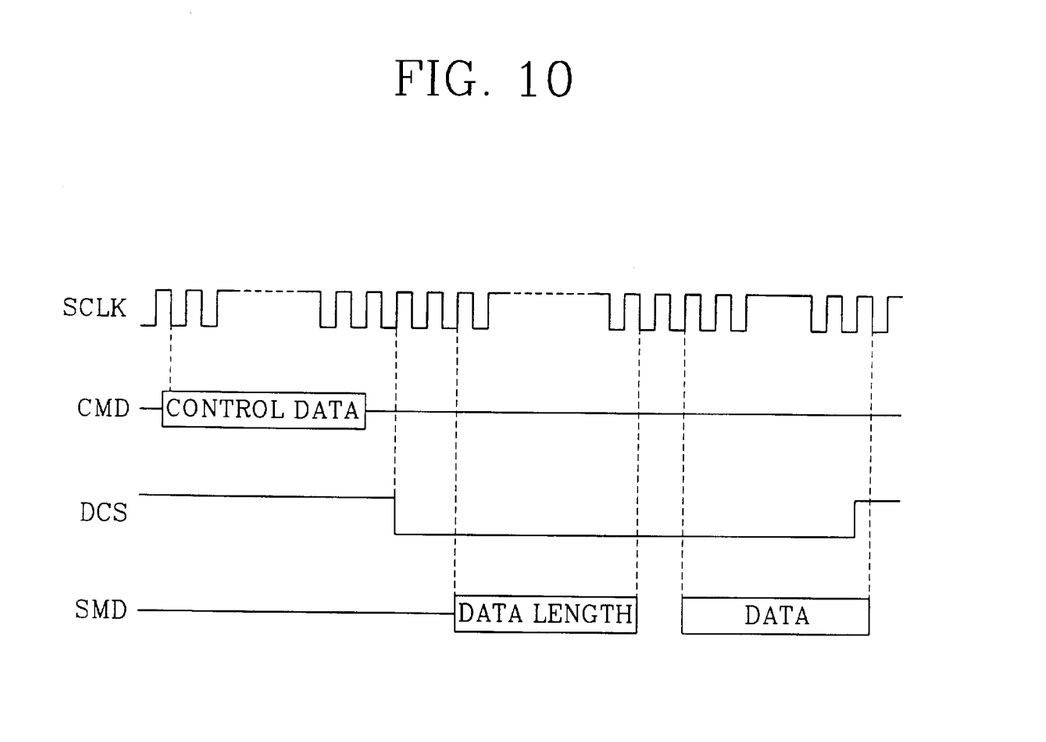
FIG. 10 is a view illustrating timing waveforms for transmitting data from the BRI blocks to the control board in FIG. 5.
Figure 12:
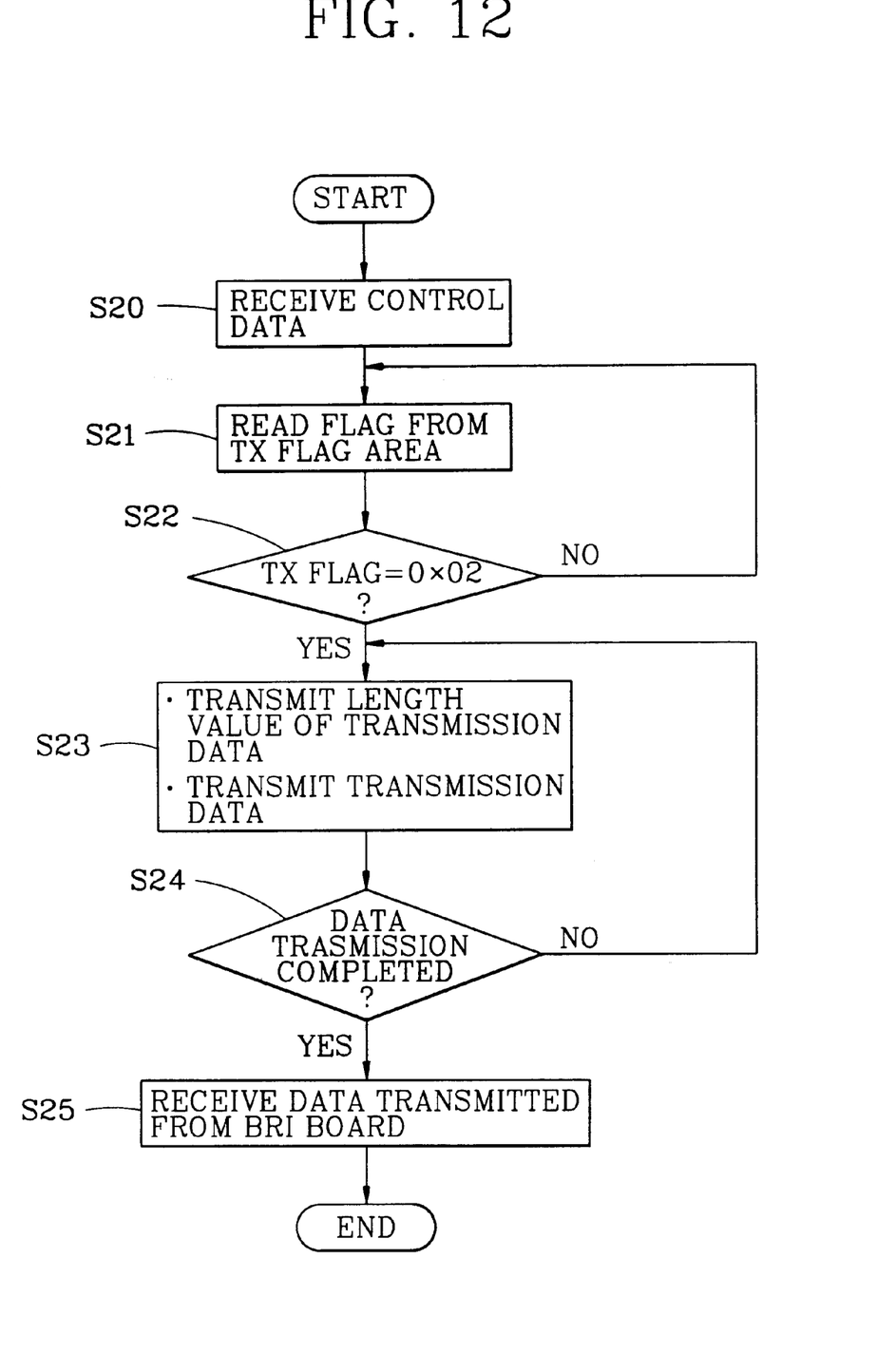
FIG. 12 is a flow chart illustrating transmission of data from the BRI blocks to the control board in FIG. 9.

(2) Data Transmission from BRI boards to Control Board As shown in FIGS. 10 and 12, the BRI board unit 60 receives the control data, for example, the control data 001101 for identifying whether transmission data is periodically transmitted from the control board 50 to the present BRI board in the board unit 60 in step S20.

As a result, the BRI board unit 60 is set at the length/data read mode LDRM only when the BRI board select signal VAL of the control data 001101 is "0" and reads the RX flag from the TX flag area of its own in step S21. At this time, the control board 50 transits the control data synchronous signal DCS to a low level.

An example will now be taken, wherein the BRI#2 transmits data to the control board 50.

First, BRI#2 identifies the valid bit C5 of the received control data and reads the TX flag from the TX flag area of its own only when the BRI board select signal VAL is "0" and then confirms whether the read TX flag is 0x02 representing the access complete of the control board 50 in step S22.

When the TX flag is confirmed not to be 0x02, the step S21 is performed again and when the TX flag is set at 0x02, the BRI#2 writes the 0x03 representing the access start of its own on the TX flag area, and as shown in FIG. 10, the transmission data is transmitted through the data bus SMD2 to the control board 50 together with the 2-byte data length value of the transmission data in step S23. When the data transmission is completed, the BRI#2 writes 0x04 representing the access complete of its own on the TX flag area in step S24.

Accordingly, the control board 50 writes 0x01 representing the access start on the TX flag areas of all the BRI boards of the board unit 60, confirms the data length transmitted from the BRI#2 and maintains the control data synchronous signal DCS at a low level as much as the transmission data length. When the data reception is completed, the control board 50 writes 0x02 representing the access complete on the TX flag areas of all the BRI boards of the board unit 60. Likewise, the plurality of BRI boards in the board unit 60 transmit data to the control board 50.

As discussed above, the U-interface matching circuit and method according to the present invention allows the 2 Mbps SA-bus integrated by the SC-bus and the PCM sub-highway to be connected between the control board and the plurality of BRI boards, thereby simplifying the circuit construction and realizing a high speed data transmission.

Further, a plurality of transmission data buses are connected to the plurality of BRI boards, thereby preventing data contention during the data transmission.

Still further, the present invention does not require the slot ID to be implemented in hardware as in the conventional art, thereby simplifying the circuit construction with regard to the back plane design.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. A U-interface matching circuit in an exchanging system implementing a matching function between an exchanger and a subscriber's terminal, comprising:
    a plurality of BRI (Basic Rate Interface) boards implementing a digital subscriber's matching;
    a control board controlling operating modes of the plurality of BRI boards using time-divided control data; and
    an SA (Serial Access)-bus connected between the control board and the BRI boards and providing an independent data transmission path with regard to the plurality of BRI boards.

2. The circuit of claim 1, wherein the BRI boards are activated in accordance with a valid bit setting value of the control data.

3. The circuit of claim 1, wherein the SA-bus comprises:
    a plurality of transmission lines connected in common to the plurality of BRI boards so as to transmit therethrough a clock signal and a synchronous signal from the control board to the BRI boards; and
    a plurality of data buses connected to each of the plurality of BRI boards for data transmission between the control board and the BRI boards.

4. The circuit of claim 3, wherein the transmission lines comprise
    a first transmission line transmitting a data clock signal;
    a second transmission line transmitting a PCM interface clock signal;
    a third transmission line transmitting a PCM frame synchronous signal; and
    a fourth transmission line transmitting a control data synchronous signal.

5. The circuit of claim 3, wherein the data buses comprise:
    a first transmission data bus transmitting the data of the control board to the BRI boards; and
    a second transmission data bus transmitting the data of the BRI boards to the control board.

6. The circuit of claim 1, wherein the SA-bus is a communication path of control data, D-channel information and D-channel packet data, and PCM data.

7. The circuit of claim 1, wherein the BRI boards are mounted in the back plane and hold digital subscribers and general voice subscribers.

8. The circuit of claim 1, wherein the BRI boards comprise memories provided with signal transmission/reception state areas.

9. The circuit of claim 8, wherein the signal transmission/reception state areas are divided into TX/RX flag areas being writable/readable at both directions toward the control board and the BRI boards.

10. The circuit of claim 8, wherein the TX flag area is an area required when transmitting data from the BRI boards to the control board, and the RX flag area is an area required when transmitting data from the control board to the BRI boards.

11. The circuit of claim 9, wherein the control board sequentially writes the flags representing access start and complete of their own on the TX flag areas of the respective BRI boards at a read mode setting of the BRI boards, and sequentially writes the flags representing access start and complete of their own on the RX flag areas of the respective BRI boards at a write mode setting of the BRI boards.

12. The circuit of claim 9, wherein the BRI boards sequentially writes the flags representing access start and complete of their own on the TX flag areas when a read mode with regard to the BRI boards is set by the control board, and sequentially writes the flags representing access start and complete of their own on the RX flag areas when a write mode with regard to the BRI boards is set by the control board.

13. The circuit of claim 1, wherein the respective BRI boards comprise logic circuits storing therein a slot ID of the BRI boards, and the control board periodically writes/reads the slot ID in the logic circuit so as to identify mounting locations of the respective BRI boards.

14. A U-interface matching method, comprising:
a first step identifying mounting locations of a plurality of BRI boards;
a second step reading an RX flag area of a first BRI board for data transmission and identifying whether the read RX flag is a flag representing the access complete of the first BRI board;
a third step setting the first BRI mode as a write mode and transmitting the data length value and transmission data when the RX flag is a flag representing an access complete of the first BRI board; and
a fourth step receiving transmission data of the first BRI board.

15. The method of claim 14, wherein the control board and the plurality of BRI boards are connected to the SA-bus, and the SA-bus serves as an independent data transmission path with regard to the plurality of BRI boards.

16. The method of claim 14, wherein the control board periodically writes/reads the slot ID on/from a logic circuit provided within the plurality of BRI boards so as to identify mounting locations of the BRI boards.

17. The method of claim 14, wherein the BRI boards include memories provided with signal transmission/reception state areas, and the signal transmission/reception state areas are represented in TX/RX flag areas being writable/readable at both directions toward the control board and the BRI boards.

18. The method of claim 14, wherein the control board in the first to third steps sequentially writes the RX flag representing the access start/complete on their own RX flag areas of the respective BRI boards, and the BRI boards in the fourth step sequentially writes the RX flags representing the access start/complete on their own RX flag areas.

19. A U-interface matching method, comprising:
a first step setting a read mode by a control board;
a second step reading a TX flag area and identifying whether the read TX flag represents an access complete of the control board;
a third step transmitting a data length value and transmission data to the control board when the TX flag is a flag representing an access complete of the control board; and
a fourth step receiving the data from the control board.

20. The method of claim 19, wherein the first BRI board in the second and third steps sequentially writes the RX flag representing the access start/complete on their own RX flag areas, and the control board in first and fourth steps sequentially writes the RX flags representing the access start/complete on the RX flag area of the first BRI board.

* * * * *